US008064287B2

(12) United States Patent
Harris et al.

(10) Patent No.: US 8,064,287 B2
(45) Date of Patent: Nov. 22, 2011

(54) METHOD FOR INTERPRETING SEISMIC DATA AND CONTROLLED SOURCE ELECTROMAGNETIC DATA TO ESTIMATE SUBSURFACE RESERVOIR PROPERTIES

(75) Inventors: Peter Harris, Oslo (NO); Lucy MacGregor, Edinburgh (GB)

(73) Assignee: Rock Solid Images, Inc., Houston, TX (US)

( * ) Notice: Subject to any disclaimer, the term of this patent is extended or adjusted under 35 U.S.C. 154(b) by 626 days.

(21) Appl. No.: 11/646,935

(22) Filed: Dec. 28, 2006

(65) Prior Publication Data

US 2008/0162049 A1 Jul. 3, 2008

(51) Int. Cl.
*G01V 1/00* (2006.01)
(52) U.S. Cl. ......................................................... 367/38
(58) Field of Classification Search .................... 367/25, 367/31, 32, 38; 324/323, 335, 354
See application file for complete search history.

(56) References Cited

U.S. PATENT DOCUMENTS

| 5,444,619 | A | * | 8/1995 | Hoskins et al. ................. 702/13 |
| 5,675,147 | A | * | 10/1997 | Ekstrom et al. ............... 250/256 |
| 5,992,519 | A | * | 11/1999 | Ramakrishnan et al. 166/250.15 |
| 6,374,185 | B1 | | 4/2002 | Taner et al. |
| 6,388,947 | B1 | * | 5/2002 | Washbourne et al. .......... 367/73 |
| 6,603,313 | B1 | * | 8/2003 | Srnka ............................ 324/354 |
| 6,670,813 | B2 | * | 12/2003 | Strack ............................ 324/323 |
| 6,739,165 | B1 | | 5/2004 | Strack |
| 6,957,146 | B1 | * | 10/2005 | Taner et al. ..................... 702/14 |
| 7,328,107 | B2 | * | 2/2008 | Strack et al. .................... 702/14 |
| 7,333,893 | B2 | * | 2/2008 | Burtz et al. ..................... 702/14 |
| 7,340,348 | B2 | * | 3/2008 | Strack et al. .................... 702/14 |
| 7,362,102 | B2 | * | 4/2008 | Andreis ......................... 324/365 |
| 7,453,763 | B2 | * | 11/2008 | Johnstad ........................ 367/20 |
| 7,574,410 | B2 | * | 8/2009 | Strack ............................ 706/21 |
| 2006/0203613 | A1 | * | 9/2006 | Thomsen et al. ............... 367/38 |
| 2008/0059075 | A1 | * | 3/2008 | Colombo et al. ............... 702/18 |
| 2008/0068020 | A1 | * | 3/2008 | Tompkins ...................... 324/335 |

FOREIGN PATENT DOCUMENTS

EP 0367495 5/1990
WO 0060379 10/2000

OTHER PUBLICATIONS

Chen et al. "Joint stochastic inversion of geophysical data for reservoir parameter estimation." SEG 2003.*

(Continued)

*Primary Examiner* — Jack Keith
*Assistant Examiner* — Krystine Breier
(74) *Attorney, Agent, or Firm* — Locke Lord Bissell & Liddell LLP

(57) ABSTRACT

A method for mapping a property of a subsurface reservoir includes determining a value of at least one reservoir property from measurements obtained from a well drilled through the reservoir. A relationship is determined between the at least one property of the reservoir and at least one seismic attribute and at least one electromagnetic survey attribute at a geodetic position of the well. A value of the at least one reservoir property is determined at at least one other geodetic position from a value of the at least one seismic attribute, a value of the at least one electromagnetic survey attribute at the at least one other geodetic position, and from the determined relationship.

6 Claims, 3 Drawing Sheets

OTHER PUBLICATIONS

Hoversten, G.M., Cassassuce, F., Gasperikova, E., Newman, G., Chen, J., Rubin, Y., Hou, Z., and Vasco, D., "Direct reservoir parameter estimation using joint inversion of marine seismic AVA and CSEM data," Geophysics, vol. 71, No. 3, May-Jun. 2006, p. C1-C13, copyright 2006 Society of Exploration Geophysicists.

UK Combined Search and Examination Report for Corresponding Application No. GB0724639.0, published Apr. 9, 2008.

White, D., Boerner, D., Wu, J., Lucas, S., Berrer, E., Hannila, J., and Somerville, R. "Mineral exploration in the Thompson nickel belt, Manitoba, Canada, using seismic and controlled-source EM methods." Geophysics, Nov.-Dec. 2000, Society of Exploration Geophysicists, vol. 65, No. 6, p. 1871-1881.

International Search Report for Corresponding International Patent Application No. PCT/GB2007/004869, published Mar. 18, 2008.

Written Opinion for Corresponding International Patent Application No. PCT/GB2007/004869, published Mar. 18, 2008.

* cited by examiner

METHOD FOR INTERPRETING SEISMIC DATA AND CONTROLLED SOURCE ELECTROMAGNETIC DATA TO ESTIMATE SUBSURFACE RESERVOIR PROPERTIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of subsurface Earth exploration using seismic and electromagnetic survey data. More specifically, the invention is related to methods for using seismic and electromagnetic data that have been correlated to subsurface well data to provide estimates of reservoir properties in locations separated from the location of the well data.

2. Background Art

Seismic exploration for oil and gas is performed by use of a source of seismic energy and the reception of the energy generated by the source by an array of seismic detectors. On land, the source of seismic energy may be a high explosive charge or another energy source having the capacity to deliver a series of impacts or mechanical vibrations to the Earth's surface. Elastic waves generated by these sources travel downwardly into the Earth's subsurface and are reflected back from strata boundaries and reach the surface of the earth at varying intervals of time, depending on the distance traveled and the characteristics of the subsurface traversed. These returning waves are detected by the sensors, which function to transduce such waves into representative electrical or optical signals. The detected signals are recorded for later processing using digital computers. Typically, an array of sensors is deployed along a line to form a series of detection locations. More recently, seismic surveys are conducted with sensors and sources laid out in generally rectangular grids covering an area of interest, rather than along a single line, to enable construction of three dimensional views of reflector positions over wide areas. Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

Initially, seismic traces were used simply for ascertaining formation structure. However, in 1979, Taner et al. published the work "Complex Seismic Trace Analysis", Geophysics, Volume 44, pp. 1041-1063, and exploration geophysicists have subsequently developed a plurality of time-series transformations of seismic traces to obtain a variety of characteristics that describe the traces, which are generally referred to as "attributes". Attributes may be computed prestack or poststack. Poststack attributes include reflection intensity, instantaneous frequency, reflection heterogeneity, acoustic impedance, velocity, dip, depth and azimuth. Prestack attributes include moveout parameters such as amplitude-versus-offset ("AVO"), and interval and average velocities.

It has been observed that specific seismic attributes are related to specific subsurface properties. For example, acoustic impedance may be related to porosity. Other subsurface properties appear to be related to other seismic attributes, but it may be unclear what the relationship is, as local factors may affect the data in unexpected ways.

It is well known to use well logs, such as wireline well logs, and data from core samples extracted from wellbores, to accurately determine petrophysical properties of subterranean formations penetrated by the wellbores. Petrophysical properties of subterranean formations which can be obtained from well logging or core sample operations include lithological composition, porosity, and water or hydrocarbon saturation. This information is valuable for determining the presence and extent of hydrocarbons in the area of interest. However, the portion of subsurface formations which can be measured by such well log and core data is limited in areal extent, e.g. to about six to twelve inches around the borehole from which the measurements were taken, and the petrophysical properties of a subterranean formation can vary widely in the interwell locations.

Synthetic seismic traces may be generated from well log data, typically from sonic and formation density logs. As used herein a synthetic seismic trace is an artificial seismic signal developed mathematically from a model of subsurface strata and an assumed signal source. A synthetic seismic trace is useful for demonstrating the form that a real seismic trace should take in response to the geologic conditions near the well.

Frequently, both well logging data and seismic data are available for a region of the earth which includes a subsurface region of interest. Core data may also be available. Typically, the well log data and, if available, the core data, are utilized for constructing a detailed log, or column, of subsurface properties. The seismic data, which includes data gathered in the interwell region of interest, is then utilized to estimate the structure of the subsurface formation extending between well locations. Subsurface formation property mapping, however, is typically based solely on the wireline log and core sample data. More recently, however, a number of proposals have been made for using seismic data gathered from the interwell region to improve the estimation of formation properties in the interwell region.

U.S. Pat. No. 6,374,185, assigned to the assignee of the present invention, describes a system for generating an estimate of lithological characteristics of a region of the earth's subsurface. A correlation is generated between attributes of synthetic seismic data calculated from log data from at least one wellbore penetrating said region and lithological information from said at least one wellbore. The correlation is then applied to recorded seismic data from the region of the earth's subsurface to generate the estimate.

Electromagnetic geophysical surveying known in the art includes "controlled source" electromagnetic surveying. Controlled source electromagnetic surveying includes imparting an electric field or a magnetic field into the Earth formations, those formations being below the sea floor in marine surveys, and measuring electric field amplitude and/or amplitude of magnetic fields by measuring voltages induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

U.S. Patent Application Publication No. 2004/232917 relates to a method of mapping subsurface resistivity contrasts by making multichannel transient electromagnetic ("MTEM") measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

SUMMARY OF THE INVENTION

One aspect of the invention is a method for mapping a property of a subsurface reservoir. A method according to this aspect of the invention includes determining a value of at least one reservoir property from measurements obtained from a well drilled through the reservoir. A relationship is determined between the at least one property of the reservoir and at least one seismic attribute and at least one electromagnetic survey attribute at a geodetic position of the well. A value of the at least one reservoir property is determined at at least one other geodetic position from a value of the at least one seismic attribute, a value of the at least one electromagnetic survey attribute at the at least one other geodetic position, and from the determined relationship.

A method of mapping the Earth's subsurface according to another aspect of the invention includes acquiring seismic data and electromagnetic survey data over a selected area of the Earth's subsurface. Petrophysical data are acquired from at least on well proximate the selected area. A value of at least one reservoir property is determined from the petrophysical data A relationship is determined between the at least one property of the reservoir and at least one seismic attribute and at least one electromagnetic survey attribute respectively from the seismic data and the electromagnetic survey data acquired at proximate the geodetic position of the well. A value of the at least one reservoir property is determined at at least one other geodetic position from a value of the at least one seismic attribute and a value of the at least one electromagnetic survey attribute respectively from seismic data and electromagnetic survey data acquired at the at least one other geodetic position and from the determined relationship. The method includes at least one of storing the determined value at the at least one other geodetic position and displaying the determined value at the at least one other geodetic position.

Other aspects and advantages of the invention will be apparent from the following description and the appended claims.

DETAILED DESCRIPTION

One embodiment of a method according to the invention will be explained with reference to the flow chart in FIG. 1.

The method of the invention makes use, in some embodiments, of data acquired from one or more wellbores drilled through subsurface Earth formations in an area of interest. Data acquired from the wellbore may include so called "well log" data. Such data are typically made in the form of a record with respect to depth in the subsurface of various physical parameters measured by instruments lowered into the wellbore. Such instruments may include, for example, electrical resistivity, acoustic velocity, bulk density, neutron slowing down length, neutron capture cross section, natural gamma radiation, fluid pressure in the pore spaces and time derivatives thereof, and nuclear magnetic resonance relaxation time distribution, among others. Well data may also include analyses of actual samples of the subsurface formations, such as fractional volume of pore space in any particular formations, fluid content and capillary pressure characterization of such fluids. Such data may be collectively referred to as "petrophysical data" shown at 18 in FIG. 1 for purposes of explaining the invention.

One or more subsurface reservoir parameters may be determined from the petrophysical data 18. Such parameters may include fractional volume of pore space ("porosity"), fluid content, permeability and capillary pressure characterization. The one or more reservoir properties are shown at 20 as converted from being indexed with respect to depth in the Earth to time. "Time" for purposes of this description means the two way travel time of seismic energy from a source at the Earth' surface to the particular reservoir being analyzed and back to a receiver disposed at the Earth's surface. Such conversion may be performed, for example, by velocity analysis of seismic data recorded at the Earth's surface or by a "check shot" survey made in the one or more particular wellbores being analyzed. Such velocity analyses have as output the expected two way travel time of seismic energy to any particular depth in the Earth at a particular geodetic position. A check shot survey is a record of travel time from the surface to a seismic receiver disposed in a wellbore at selected, known depths such that seismic travel time is measured rather than inferred from surface seismic velocity analysis.

Figure 1:
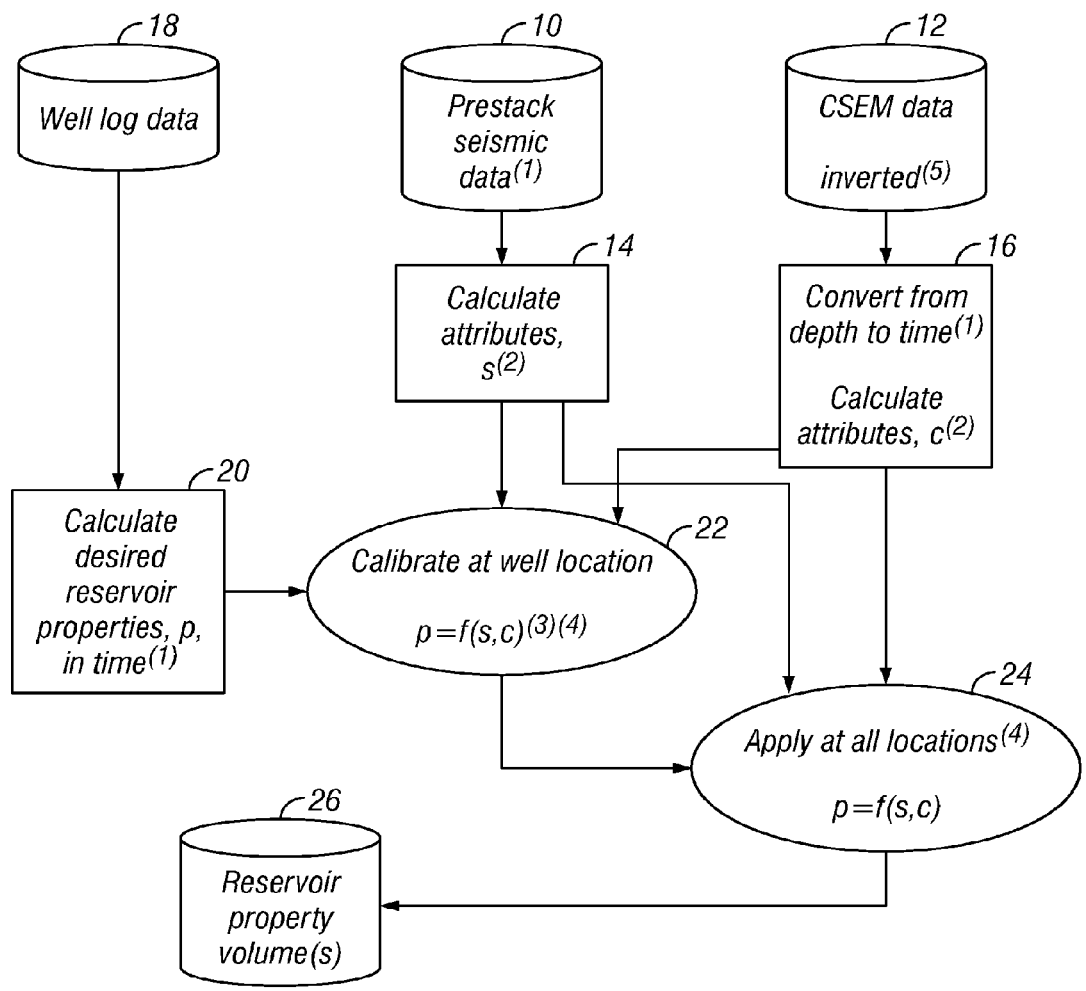
FIG. 1 shows a flow chart of one possible implementation of a method according to the invention.

At 10 in FIG. 1, seismic data acquired at the Earth's surface over a selected area of the Earth's subsurface that preferably includes or is proximate to the locations of the one or more wellbores explained above may be processed, at 14, to determine one or more attributes of the seismic data. Examples of attributes include but are not limited to acoustic impedance, elastic impedance, amplitude versus offset ("AVO") intercept and gradient, instantaneous phase, instantaneous envelope. The one or more seismic attributes will be used as further explained below.

At 12 in FIG. 1, electromagnetic survey data, which is preferably controlled source electromagnetic ("CSEM") survey data may be acquired, and inverted to produce a map of electrical properties, typically electrical conductivity, of the Earth's subsurface with respect to geodetic position and depth in the Earth. Inversion processing of such data is known in the art, such as a service sold under the service mark OHMEGA 2D, which is a service mark of Offshore Hydrocarbon Mapping plc, The Technology Centre, Offshore Technology Park, Claymore Drive, Bridge of Don, Aberdeen, AB23 8GD, United Kingdom.

For purposes of this invention, the term "electromagnetic survey data" is intended to include any form of electromagnetic survey data acquired by imparting an electromagnetic field above or near the top of an area of the Earth's subsurface to be surveyed, and measuring the Earth's response near the top of area or above the Earth's surface. Such data may be frequency domain CSEM data, transient (time domain)

CSEM data, whether data acquired by imparting either or both electric and magnetic fields to the Earth's subsurface, and so imparted along any electric or magnetic dipole moment orientation. The CSEM data may also be acquired by measuring the Earth's response to such fields by measuring imparted voltage across an electrode pair, voltage induced in a closed loop antenna, or magnetic field amplitude, again along any selected dipole moment orientation.

At 16, the inverted electromagnetic data may be converted from a depth-based representation of electrical conductivity to a time based one, using, for example, seismic velocity analysis. Seismic velocity analysis may be performed using, for example, a process known as prestack time migration. One such process is described in U.S. Pat. No. 6,826,484 issued to Martinez et al. Other procedures for velocity analysis and/or depth to time conversion of the inverted electromagnetic data are known in the art. The result of the foregoing procedures may be a record with respect to seismic two-way travel time of one or more electromagnetic attributes, for example, logarithm of electrical resistivity or conductivity. Other attributes of the electromagnetic survey data will occur to those of ordinary skill in the art.

At 22, the reservoir property or properties determined from well log data as explained above, are used to calibrate or correlate the seismic and inverted electromagnetic data at the geodetic position of the wellbore. Calibration may be performed in a number of different ways. The objective of calibration or correlation is to determine a relationship between the one or more seismic attributes, the one or more electromagnetic attributes, and the one or more determined reservoir properties. An example of a reservoir property that has been tested with a method according to the invention includes gas saturation. Gas saturation is the fractional volume of the pore spaces in the reservoir rock that is filed with gas. In one example, a simple linear equation may be used:

$$S_g = a_0 + a_1 AI + a_2 \ln nC$$

where $S_g$ represents the gas saturation, AI represents a seismically determined acoustic impedance, C represents the resistivity from the inverted electromagnetic data. $a_0$, $a_1$ and $a_2$ are coefficients determined by the calibration. In general the calibration function could be a vector function to calibrate several reservoir properties from the seismic and electromagnetic data and can be empirically determined as in the present example, or based on deterministic rock physics relationships, for example, using Archie's law to predict brine saturation from electrical resistivity. The calibration function could also be a combination of both empirical and deterministic relationships. Also any number of seismic and electromagnetic data attributes could be used in determining the calibration function. The calibration function could be defined in different ways. For example, it could be a neural network trained at a well geodetic location to predict the reservoir properties from the surface data attributes. Equally well, the function could represent a geostatistical analysis leading to co-kriging the reservoir properties with the surface (seismic and electromagnetic data) attributes at geodetic positions away from the well position. Another possibility is to perform analysis of joint probability density functions at the well, which are then used to assign reservoir properties away from the well according to a Bayesian analysis.

The calibration function determined as above at the one or more well locations is then used to make predictions of the values of the one or more reservoir properties at at least one position away from the wellbore location. The predicted value of the reservoir property may be stored in a computer readable medium and/or transmitted to a computer display or printer for output. In one embodiment, an entire area of the Earth's subsurface surveyed by the seismic data and the electromagnetic data is assigned predicted values of the one or more reservoir properties. Such is shown at 24 in FIG. 1. The area may also be mapped on the selected reservoir properties with respect to position within the survey area at more than one two way travel time. The result of such mapping is a reservoir property volume, shown at 28, which may be stored or otherwise displayed, such as in a computer memory or other computer readable medium, or displayed such as on a computer display or printout.

Figure 2:
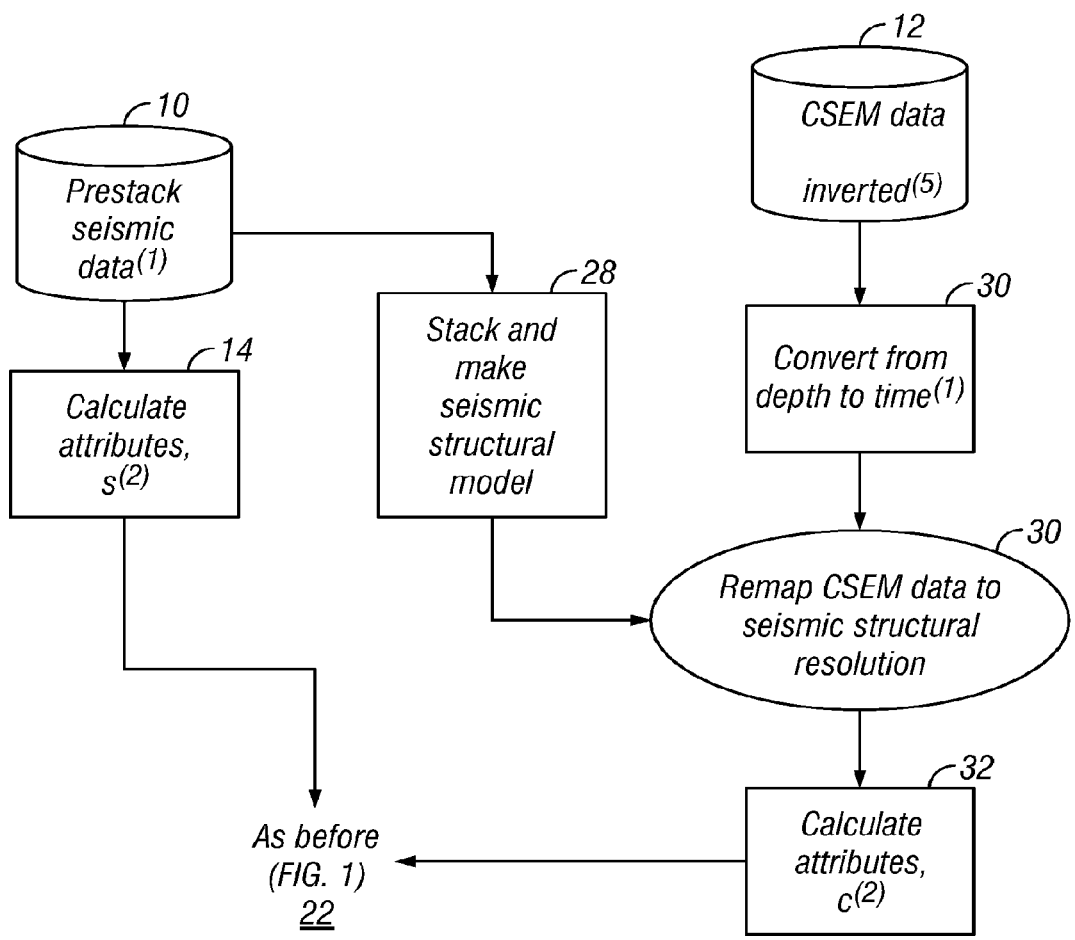
FIG. 2 shows a flow chart of additional implementation elements for matching resolution of CSEM data to that of seismic data that may be used in different embodiments of a method according to the invention.

In one embodiment as will be explained with reference to FIG. 2, resolution of the electromagnetic survey data may be substantially matched to that of the seismic data for purposes of predicting reservoir properties. In FIG. 2, seismic data are acquired and processed at 10 substantially as explained with reference to FIG. 1. Attributes of the seismic data are calculated at 14. At 12, the electromagnetic survey data are acquired and at 30 may be converted to depth, also as explained with reference to FIG. 1.

At 28, a structural model of the Earth's subsurface may be made using any one of a number of well known seismic data interpretation techniques. See, for example, the Martinez et al. '484 patent referred to above. Generally, the structural model can be in the form of one or more seismic attributes mapped with respect to geodetic position on the Earth's surface and with respect to time (or depth). The model may also be interpreted to the form of discrete layers of various Earth formations each having physical characteristics consistent with the seismic attributes calculated from the seismic data.

As will be readily appreciated by those skilled in the art, the electromagnetic survey data will typically have much lower spatial resolution than the structural model made from the seismic data. Therefore, in some embodiments, and as shown at 30 in FIG. 2, the electromagnetic data may be resolution matched to the seismic data. One example embodiment of such resolution matching is to solve, for one or more seismic data trace locations (typically a geodetic position of a seismic receiver during seismic data acquisition), a system of linear equations for the problem of what spatial distribution of electrical resistivity (or conductivity) in respect of the layering determined in the seismic model would be consistent with the resistivity (or conductivity) determined from the electromagnetic data at much lower resolution. Solving such a system may be unstable, and so in some embodiments the system of equations may be constrained. Examples of such constraints include limits on the maximum value of resistivity, resistivity must be a positive number, maximum variation in resistivity from one layer to the next, maximum variation in resistivity from one geodetic location to another adjacent or proximate location, or constraining a vertically local maximum value of resistivity from the electromagnetic data to one or more layers determined from the seismic data as likely to be reservoir bearing formations.

The result of such resolution matching is a set of resolution matched electromagnetic data attributes, as shown at 32 in FIG. 2. The seismic attributes 14 and resolution matched electromagnetic attributes 32 may then be used as explained above with reference to FIG. 1 to determine a relationship at one geodetic location between a reservoir parameter and at selected seismic and electromagnetic attributes. Such calibrated or correlated attributes may be used at at least one other geodetic location to predict a value of the selected reservoir property.

Figure 3:
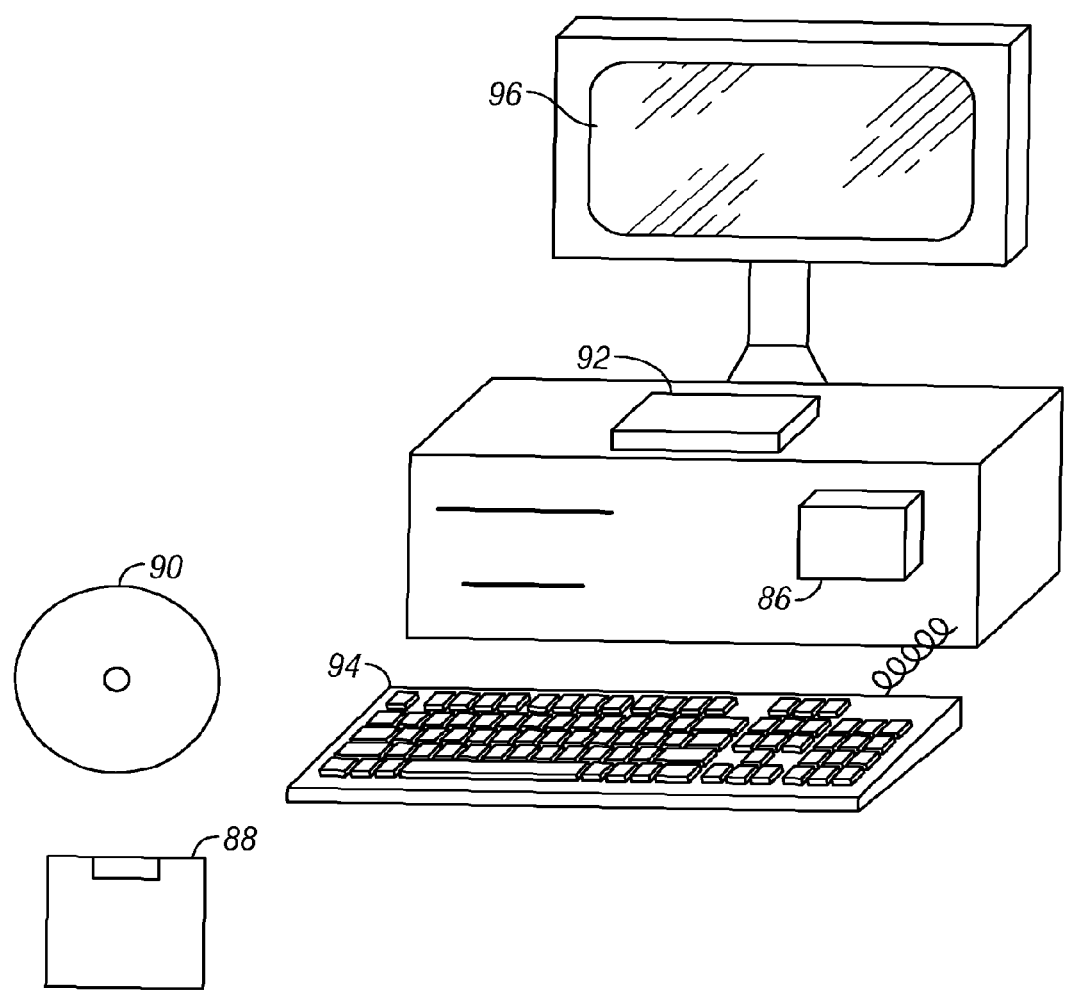
FIG. 3 shows a programmable computer and a computer readable medium therein including an example computer program according to another aspect of the invention.

In another aspect, the invention relates to computer programs stored in a computer readable medium. Referring to FIG. 3, the foregoing process as explained with respect to FIGS. 1 and 2 can be embodied in computer-readable code stored on a computer readable medium, such as floppy disk 88, CD-ROM 90 or magnetic hard drive 86 forming part of a general purpose programmable computer. The computer, as known in the art, includes a central processing unit 92, a user input device such as a keyboard 94 and a user display 96 such as a flat panel LCD display or cathode ray tube display. According to this aspect of the invention, the computer readable medium includes logic operable to cause the computer to execute steps as set forth above and explained with respect to FIGS. 1 and 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mapping a property of a subsurface reservoir, comprising:
    determining a value of at least one reservoir property from measurements obtained from a well drilled through the reservoir
    determining a relationship between the at least one property of the reservoir and at least one seismic attribute and at least one electromagnetic survey attribute respectively from seismic data acquired and electromagnetic survey data acquired at a geodetic position of the well;
    determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship;
    at least one of storing the determined value at the at least one other geodetic position and displaying the determined value at the at least one other geodetic position; and
    matching a resolution of the electromagnetic survey data to a resolution of the seismic data comprising solving a constrained system of linear equations.

2. A method for mapping a property of a subsurface reservoir, comprising:
    determining a value of at least one reservoir property from measurements obtained from a well drilled through the reservoir
    determining a relationship between the at least one property of the reservoir and at least one seismic attribute and at least one electromagnetic survey attribute respectively from seismic data acquired and electromagnetic survey data acquired at a geodetic position of the well, comprising solving a set of linear equations relating the reservoir property to the at least one seismic attribute and the at least one electromagnetic survey attribute;
    determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship; and
    at least one of storing the determined value at the at least one other geodetic position and displaying the determined value at the at least one other geodetic position.

3. A computer program stored in a computer readable medium, the program having logic operable to cause a programmable computer to perform steps comprising:
    determining a value of at least one reservoir property from measurements obtained from a well drilled through the reservoir
    determining a relationship between the at least one property of the reservoir and at least one seismic attribute and at least one electromagnetic survey attribute respectively from seismic data acquired and electromagnetic survey data acquired at a geodetic position of the well;
    determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship;
    at least one of storing the determined value at the at least one other geodetic position and displaying the determined value at the at least one other geodetic position; and
    matching a resolution of the electromagnetic survey data to a resolution of the seismic data comprising solving a constrained system of linear equations.

4. A computer program stored in a computer readable medium, the program having logic operable to cause a programmable computer to perform steps comprising:
    determining a value of at least one reservoir property from measurements obtained from a well drilled through the reservoir
    determining a relationship between the at least one property of the reservoir and at least one seismic attribute and at least one electromagnetic survey attribute respectively from seismic data acquired and electromagnetic survey data acquired at a geodetic position of the well, comprising solving a set of linear equations relating the reservoir property to the at least one seismic attribute and the at least one electromagnetic survey attribute;
    determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship;
    at least one of storing the determined value at the at least one other geodetic position and displaying the determined value at the at least one other geodetic position.

5. A method of mapping the Earth's subsurface comprising:
    acquiring seismic data over a selected area of the Earth's subsurface;
    acquiring electromagnetic survey data over the selected area of the Earth's subsurface;
    acquiring petrophysical data from at least on well proximate the selected area;
    determining a value of at least one reservoir property from the petrophysical data;
    determining a relationship between the at least one property of the reservoir and at least one seismic attribute and at least one electromagnetic survey attribute respectively from the seismic data and the electromagnetic survey data acquired at proximate the geodetic position of the well;
    determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship;

at least one of storing the determined value at the at least one other geodetic position and displaying the determined value at the at least one other geodetic position; and matching a resolution of the electromagnetic survey data to a resolution of the seismic data comprising solving a constrained system of linear equations.

6. A method of mapping the Earth's subsurface comprising:

acquiring seismic data over a selected area of the Earth's subsurface;

acquiring electromagnetic survey data over the selected area of the Earth's subsurface;

acquiring petrophysical data from at least on well proximate the selected area;

determining a value of at least one reservoir property from the petrophysical data;

determining a relationship between the at least one property of the reservoir and at least one seismic attribute and at least one electromagnetic survey attribute respectively from the seismic data and the electromagnetic survey data acquired at proximate the geodetic position of the well, comprising solving a set of linear equations relating the reservoir property to the at least one seismic attribute and the at least one electromagnetic survey attribute;

determining a value of the at least one reservoir property at least one other geodetic position from a value of the at least one seismic attribute and a value of the at least one electromagnetic survey attribute respectively from seismic data and electromagnetic survey data acquired at the at least one other geodetic position and from the determined relationship; and at least one of storing the determined value at the at least one other geodetic position and displaying the determined value at the at least one other geodetic position.

* * * * *